United States Patent [19]

Herold

[11] 4,243,628

[45] Jan. 6, 1981

[54] METHOD FOR THE MANUFACTURE OF PLASTIC INSULATORS WITH SCREENS FOR INDOOR AND OUTDOOR USE

[75] Inventor: Georg Herold, Lichtenfels, Fed. Rep. of Germany

[73] Assignee: Siemens Aktiengesellschaft, Berlin and Munich, Fed. Rep. of Germany

[21] Appl. No.: 943,307

[22] Filed: Sep. 18, 1978

[30] Foreign Application Priority Data

Sep. 19, 1977 [DE] Fed. Rep. of Germany ....... 2742042

[51] Int. Cl.$^3$ ............................................... B29F 1/10
[52] U.S. Cl. .................................... 264/275; 264/254; 264/277; 264/279; 264/328.1; 264/DIG. 54
[58] Field of Search ................................. 264/328–329, 264/331, DIG. 54, 272, 275, 273, 279, 254, 277

[56] References Cited

U.S. PATENT DOCUMENTS

| | | | |
|---|---|---|---|
| 2,305,877 | 12/1942 | Klingler et al. | 264/328 |
| 2,422,809 | 6/1947 | Stupakoff et al. | 264/329 |
| 3,001,005 | 9/1961 | Sonnenberg | 264/273 |
| 3,025,572 | 3/1962 | Bosoni | 264/329 |
| 3,087,201 | 4/1963 | Williams et al. | 264/328 |
| 3,192,312 | 6/1965 | Sauer | 264/272 |
| 3,534,133 | 10/1970 | Koch et al. | 264/314 |
| 3,777,000 | 12/1973 | Kusenberg et al. | 264/328 |

*Primary Examiner*—Jeffery R. Thurlow
*Attorney, Agent, or Firm*—Kenyon & Kenyon

[57] ABSTRACT

Plastic insulators with protective screens for indoor and outdoor use, especially support and suspension insulators are manufactured by injection molding or transfer molding, using granulated or paste-like molding compounds (rigid or flexible adjustment) on the basis of unsaturated polyester or epoxy resins, heterocyclic polyurethane resins, polypropylene (PP), ethylene-propylene monomer rubber (EPM), ethylene-propylene-diene monomer rubber (EPDM), synthetic rubber, silicone rubber and others. The fabrication can be carried out through one-part or multiple-part injection.

11 Claims, 4 Drawing Figures

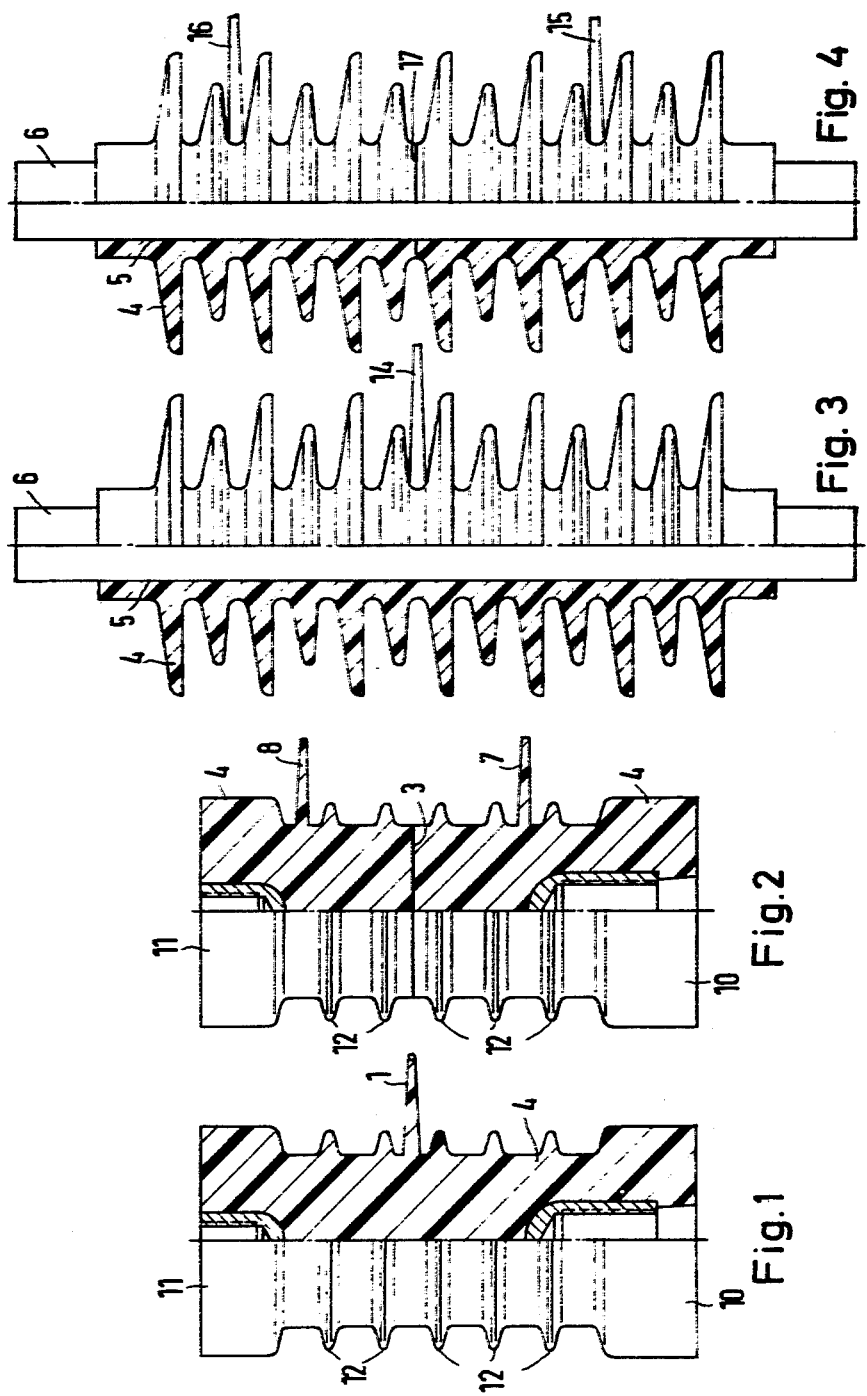

METHOD FOR THE MANUFACTURE OF PLASTIC INSULATORS WITH SCREENS FOR INDOOR AND OUTDOOR USE

BACKGROUND OF THE INVENTION

It is known that insulators can be manufactured by the casting method with more or less filled plastic molding compounds on the basis of aromatic, cycloaliphatic or heterocyclic epoxy resins or also rubber systems such as silicone rubber (U.S. Pat. No. 3,484,983). For this mold casting, the compounds can be adjusted rigid or flexible. Frequently, plastic materials, particularly polytetrafluoroethylene (PTFE), are processed into insulators by the sintering method (British Pat. No. 1,066,209) and epoxy systems are frequently processed by the centrifugal casting method. For radiation-cross-linked silicone rubber, the assembly type of construction is used predominantly, with pre-fabricated individual screen elements being fabricated by the molding method.

Long rods are usually made by covering fiberglass-reinforced rods by the casting, sintering or assembly method. The rod is placed in a mold for this purpose and cast or sintered all around, or, alternatively, screen elements may be molded first and then drawn upon a core and joined or cemented to the latter by means of an adhesion agent.

These known methods have considerable disadvantages, especially for quantity production. Thus, there are limits due to the molds in the fabrication by the casting method. Furthermore, most of the available materials are not so flexible that they can follow, for example, in the case of suspension insulators, the elongation of the rod under tensile stress occurring in line operation. Thus, they cannot be applied to the fiberglass-reinforced core directly without the interposition of an elastic layer. It is a further disadvantage, for example, that for casting larger quantities, several molds are required. One most work in parallel operations, usually with expensive tools.

SUMMARY OF THE INVENTION

It is an object of the invention to manufacture plastic insulators with protective screens for indoor and outdoor use, especially support and suspension insulators, in quantity production and in continuous operation, using, if possible, only a single mold.

According to the invention, this problem is solved by the provision that molding compounds which are injection-moldable, electrically high-quality, hydrophobic, leakage current-resistant, erosion and temperature-resistant, and optionally highly elastic in the ± temperature range, and possessed of high notch impact resistance, are processed by injection-molding or transfer molding. The plastic molding compounds can be provided with any desired inorganic and/or organic fillers, where the filler content can be high, preferably 30 to 60% by weight, referred to the total weight. The molding compounds are processed in conventional plunger or worm-type injection molding machines. To manufacture the molded bodies, the thermoplastic, thermosetting-plastic or elastomeric molding compounds (with or without filler) are fed, according to the invention, to the injection unit and are plasticized while being heated. Subsequently, the plasticized compound is injected under pressure into a mold. The moldings obtained in this manner are free of voids and pores. The manufacturing cycles are very short for high production rates and are in the order of a few minutes. Through appropriate choice of the material, moldings with higher aging, oil, ozone and climatic resistance and also, specifically, with special property patterns, such as self-quenching or leakage-current resistance, can be manufactured.

It is a very special advantage of the procedure according to the invention that by injection molding partial sections onto the first-fabricated part, insulators of any desired length can be produced, independent of the tool.

According to the invention, the plastic molding compounds can be plasticized at temperatures of about 150° to 280° C. and injected under pressure into molds with temperatures of $\leqq 100°$ C. or, alternatively, plasticized at temperatures of $\leqq 100°$ C. and injected under pressure into hot molds, preferably into molds with a temperature of $\geqq 140°$ C.

For special applications, for example, when using thermoplastics and rubber systems for long rods, it has been found advantageous if the surface of the part to be injection-coated, such as the surface of GFK rods, is pre-treated, e.g., degreased or sand-blasted and/or if an adhesion agent or an adhesive layer is applied.

According to the method of the invention, single part as well as repeatedly injected-on insulators can be manufactured in plunger or worm-type injection molding machines. It is particularly suitable for manufacturing support and suspension insulators with screens, where entire units of one-piece insulators with screens or multiple-part units with screens can be produced; one-piece, for example, in the medium-voltage range and multiple-part for high-voltage series, for example, $\geqq 110$ kV. With this procedure, suspension insulators are produced to advantage. A degreased, sanded GFK rod provided with an adhesion agent is placed in a tempered mold and injection-molded all around.

Molding compounds suitable for carrying out the method according to the invention are injection-moldable thermosetting plastics, thermoplastics and elastomers, such as those based on aromatic, cycloaliphatic and heterocyclic epoxy resins, polyurethane (PUR) and polyester resins, polytetrafluoro ethylene (PTFE), polypropylene (PP) and rubber-modified polyolefins, such as ethylene-propylene monomer rubber (EPM) and ethylene-propylene-diene monomer rubber (EPDM) and their mixtures as well as mixtures with other molding compounds of duroplastic, thermoplastic and elastomeric nature.

The molding compounds may contain softeners, pigments, dyes, mold release agents, and the like. As stretchers and fillers may also be used, for example, calcite, rutile, quartz powder, kaolin, talc, aluminum oxide trihydrate, sulfates and their mixtures. Good properties were achieved with a high filler content, especially silanized quartz powder.

Especially well suited was found to be a flowable granulate of a mixture of 20 to 30% by weight polypropylene (PP), 50 to 60% by weight ethylene-propylene-diene monomer rubber (EPDM) and 20 to 30% by weight silanized quartz powder.

For the manufacture of support insulators, predominantly low-viscosity thermoplastic systems which can be processed at pressures of $\leqq 50$ bar have also proven themselves.

The subsequent fastening of fittings is performed in the usual manner as, for example, in long rods by wedging the rod ends into the conical interior of the fittings or by other practiced coupling methods such as prior placement of fastener bushings and cementing the insulator ends into forked caps.

DETAILED DESCRIPTION OF THE INVENTION

To explain the invention in greater detail and to make clear the advance achieved thereby, reference is made to the drawing which illustrates the situation by means of embodiment examples.

BRIEF DESCRIPTION OF THE DRAWINGS

In FIGS. 1 and 2, a support insulator is shown and in FIGS. 3 and 4, a suspension insulator in cross section. The left-hand side shows the respective insulator and the right-hand side the production design.

FIGS. 1 and 2 show support insulators such as are used indoors, for example, and which consist in the known manner of a base 10, the support insulator head 11 and the ribs 12 arranged therebetween. In a support insulator according to FIG. 1, the insulating material is made by a single injection at 1 and according to FIG. 2, by means of two injections at 7 and 8. The cementing or joining point is designated as the numeral 3.

In the suspension insulators shown in FIGS. 3 and 4, which are made by injection molding around GFK rods with the corresponding insulating material, the plastic is again designated with 4, the adhesion agent with 5 and the fiber-glass-reinforced core with 6. The suspension insulator as per FIG. 3 is made by a single injection at 14 and the one as per FIG. 4 by a first injection at 15 and a second injection at 16. The cementing line is designated with 17.

What is claimed is:

1. A method for manufacturing plastic insulators with screens for indoor and outdoor use, comprising providing a first-fabricated screen part within a mold and injection-molding or transfer molding onto said part one or more injection-moldable, electrically high quality, hydrophobic, leakage-current-resistant, erosion and temperature resistant molding compounds having a high notch impact strength, said injection molding comprising plasticizing said molding compound under heat and injecting said compound into the mold under pressure, said molding compound comprising a thermosetting plastic, thermoplastic or elastomeric material comprising from 0 to 60% by weight thereof of filler materials.

2. The method according to claim 1 wherein said molding compound is highly elastic in the $\pm$ temperature range.

3. The method according to claim 1 wherein said molding compounds further comprise from about 30 to about 60% by weight of finely distributed filler materials.

4. The method according to claim 1 wherein said molding compounds comprise a member selected from the group consisting of aromatic, cycloaliphatic and heterocyclic epoxy resins, polyurethane resins and polyester resins.

5. The method according to claim 1 wherein said molding compound comprises a member selected from the group consisting of rubber-modified polyolefins, synthetic rubbers and silicone rubbers.

6. The method according to claim 5 wherein said rubber-modified polyolefin is selected from the group consisting of ethylene-propylene monomer rubber, ethylene-propylene-diene monomer rubber, and mixtures thereof.

7. The method according to claim 1 wherein said molding compound is plasticized under heat and injected under pressure into a mold.

8. The method according to claim 7 wherein said molding compound is plasticized at a temperature of from about 150° C. to about 280° C. and injected under pressure into a mold with a mold temperature of about 100° C. or less.

9. The method according to claim 8 wherein said molding compound is plasticized at a temperature of from about 100° C. or less and is injected under pressure into a mold with a mold temperature of at least about 140° C.

10. The method according to claim 3 wherein said filled molding composition is of low viscosity of up to about 50,000 cp and is processed at a pressure of about 50 bar or less.

11. The method according to claim 1 wherein plastic insulator is a single or multiple-piece insulator.

* * * * *